United States Patent
Docheff, III et al.

(10) Patent No.: US 6,702,523 B1
(45) Date of Patent: Mar. 9, 2004

(54) MATERIAL HANDLING AIR CONVEYOR

(76) Inventors: Metro Joseph Docheff, III, 3933 County Rd. 3, Parshall, CO (US) 80468-8803; Robert S. Howard, P.O. Box 1281, Kremmling, CO (US) 80459-1281

( * ) Notice: Subject to any disclaimer, the term of this patent is extended or adjusted under 35 U.S.C. 154(b) by 0 days.

(21) Appl. No.: 10/249,118

(22) Filed: Mar. 17, 2003

Related U.S. Application Data

(60) Provisional application No. 60/431,092, filed on Dec. 5, 2002.

(51) Int. Cl.[7] ............................................. B65G 53/00
(52) U.S. Cl. ........................ 406/197; 406/92; 406/194
(58) Field of Search .......................... 406/92, 194, 197

(56) References Cited

U.S. PATENT DOCUMENTS

| | | | |
|---|---|---|---|
| 5,118,225 A | | 6/1992 | Koch |
| 5,415,323 A | * | 5/1995 | Fenelon .................. 222/1 |
| 5,478,172 A | * | 12/1995 | Oura et al. ................ 406/23 |
| 5,931,610 A | * | 8/1999 | Rixom et al. ............... 406/32 |
| 5,947,645 A | | 9/1999 | Rixom |
| 6,283,327 B1 | | 9/2001 | Rubstov |

* cited by examiner

Primary Examiner—Joseph A. Dillon
(74) Attorney, Agent, or Firm—Oppedahl & Larson LLP

(57) ABSTRACT

A loading apparatus includes a loading tube with an input end and an output end, the input end positioned between three and six feet above a surface, the output end positioned between six and twenty feet above the surface. The surface is sufficiently strong to support a concrete mixer. The loading tube further comprises at least one nozzle positioned at the loading tube between the input end and the output end, the nozzle disposed so that air passing through the nozzle into the loading tube flows toward the output end. A valve is connected with the at least one nozzle, disposed to permit and deny air flow through the valve to the at least one nozzle. To use the apparatus, the loading tube and a concrete mixer are positioned so that the fill opening of the mixer is below the output end. Air is caused to flow through the at least one nozzle. A predetermined number of water-soluble bags of material are counted, and the bags are placed, one by one, into the input end of the tube. They are first sucked, and then pushed, into the mixer, where bags dissolve, releasing their contents into the mixer.

5 Claims, 5 Drawing Sheets

MATERIAL HANDLING AIR CONVEYOR

CROSS REFERENCE TO RELATED APPLICATIONS

This application claims priority from U.S. application Ser. No. 60/431,092, filed Dec. 5, 2002, which application is hereby incorporated herein by reference.

BACKGROUND OF INVENTION

Concrete has been used since antiquity for construction. The Coliseum of Rome was made of concrete. Concrete is well suited to many construction applications. Concrete has, however, a drawback in that it has only very limited tensile strength. For many decades, metal reinforcing rods have been used to remedy this limitation of concrete. The rods are set into place in a mold and concrete is poured into the mold and over and around the rods.

Placing the rods is a labor-intensive task which has prompted investigators to explore other ways of remedying the tensile-strength limitation of concrete. Experience also shows that it can occasionally happen that the rods shift during pouring, which can lead to the rods being in the wrong place when the concrete cures.

It has become commonplace in recent years to augment the tensile strength of concrete with synthetic fibers. In some applications the fiber can serve as a replacement for the reinforcing rods. In other applications it is desirable to use both fiber and reinforcing rods.

In some applications it is desirable to add coloring agents to concrete.

Makers of concrete fiber additives and concrete colorants often make their products available in bags that are able to dissolve when mixed with concrete. Thus in a typical application, a user who wishes to add some predetermined amount of fiber or colorant to a concrete batch will simply throw the bags into the mixer. The bags get wet and dissolve and the mixing process will distribute the fiber or colorant evenly through the batch. The bag is made from a material selected so that it dissolves and so that it does not harm the concrete when it is dissolved.

One way that a user may add bags to a load is to count a desired number of bags, hold the bags in one arm, climb the rear-mounted ladder on the concrete mixer (using only the other arm), and drop the bags into the loading funnel. This can be awkward and, like any maneuver in which someone is off the ground, presents a risk that the person may fall.

Several complicated devices have been proposed to deal with loading fiber into concrete mixes, including U.S. Pat. Nos. 5,118,225 to Koch et al., 5,947,645 to Rixon et al., and 6,283,327 to Rubtsov. These devices are complicated and expensive and have many moving parts.

There is thus a need for a simple and inexpensive apparatus for loading bags of fiber and colorants into concrete mixers.

SUMMARY OF INVENTION

A loading apparatus includes a loading tube with an input end and an output end, the input end positioned between three and six feet above a surface, the output end positioned between six and twenty feet above the surface. The surface is sufficiently strong to support a concrete mixer. The loading tube further comprises at least one nozzle positioned at the loading tube between the input end and the output end, the nozzle disposed so that air passing through the nozzle into the loading tube flows toward the output end. A valve is connected with the at least one nozzle, disposed to permit and deny air flow through the valve to the at least one nozzle. To use the apparatus, the loading tube and a concrete mixer are positioned so that the fill opening of the mixer is below the output end. Air is caused to flow through the at least one nozzle. A predetermined number of water-soluble bags of material are counted, and the bags are placed, one by one, into the input end of the tube. They are first sucked, and then pushed, into the mixer, where bags dissolve, releasing their contents into the mixer.

BRIEF DESCRIPTION OF DRAWINGS

The invention will be described with respect to a drawing in several figures.

DETAILED DESCRIPTION

Figure 1:
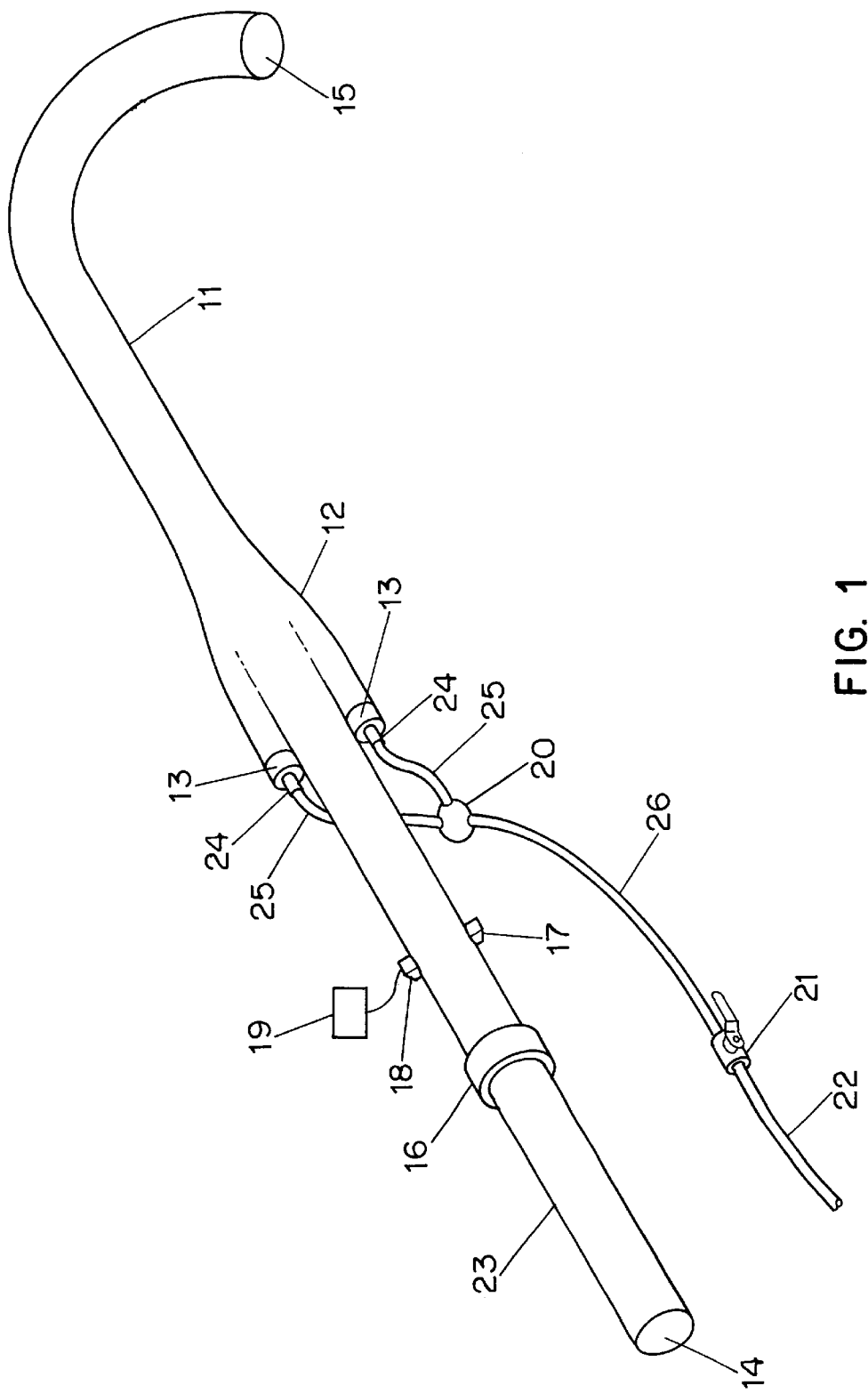
FIG. 1 is a plan view of apparatus according to an embodiment of the invention.

Turning now to FIG. 1, what is shown is apparatus according to an embodiment of the invention. An inlet 14 is placed at ground level. In this context "ground level" means a level that is convenient for a user who is standing on the ground. For example the inlet might preferably be about three feet (about one meter) above the ground.

Outlet 15 may also be seen. In a typical installation the outlet 15 is positioned so that it may conveniently feed into a loading funnel of a concrete mixing truck. Depending on the design of the truck this may be in the range of ten to fifteen feet above the ground.

The apparatus may be manufactured in its entirety, or may be shipped partially assembled for final assembly at the location where it will be used. In the event that it is shipped partially assembled, then one or more couplings 16 may be provided which are tightened as part of final assembly. Mounting ears or flanges may be provided for convenient mounting of the apparatus in place, omitted for clarity in FIG. 1.

Inlet pipe 23 and discharge pipe 11 make up most of the physical extent of the apparatus. For simplicity and economy of manufacture these pipes are preferably cylindrical plastic pipe and are preferably the same inside diameter for most of their length, except as described below.

The apparatus has an eccentric reducer coupling 12 which defines the extents of inlet pipe 23 and the outlet pipe 11. This coupling has at least one, and preferably several, flush style reducer bushings 13 set into it. Each reducer bushing 13 has an air fitting 24 tapped into it. Each air fitting 24 has a supply line 25 leading to a manifold 20. Manifold 20 has a supply line 26 to a control valve 21. From control valve 21, a supply line 22 goes to a source of compressed air such as an air compressor, omitted for clarity in FIG. 1.

Optionally there may be provided a bag counter 17, 18, 19. In an exemplary embodiment, this counter has a light-emitting diode 17, phototransistor 18, and numerical display 19 with a reset button, omitted for clarity in FIG. 1. The user can press the reset button which resets the numerical display 19 to zero. Bags of material are passed through the apparatus, each of which momentarily breaks the light beam between the light-emitting diode 17 and the phototransistor 18. Each such break of the light beam increments the display 19. This permits a user to keep track in a convenient way of the number of bags that have been passed through the apparatus since the reset button has been pressed.

As will be appreciated, the apparatus has very few moving parts and thus very little to go wrong. In normal operation the only moving part of the apparatus is the valve 21. The apparatus has a small parts count overall and thus is not expensive to manufacture.

A typical method of use for the apparatus is as follows.

The concrete mixer is positioned so that its fill opening (e.g. funnel) is below the output end (outlet pipe 11).

The user will determine the number of bags of material to be added to the concrete. For example the user may count some predetermined number of water-soluble bags of material and position them nearby to the apparatus. Alternatively the user may reset the counter 17, 18, 19 with the plan of loading bags until the desired number of bags are indicated on the display 19 as having been loaded.

The user then opens valve 21, causing air to flow through at least one nozzle positioned at the loading tube between the input end and the output end, the nozzle disposed so that the air flows toward the output end. The nozzle is associated with and defined by the bushing 13 and air fitting 24.

One of the bags is inserted into the input end (inlet 14). With typical pipe inside diameter and with typical bags, it is most convenient to roll the bag into a rolled shape, and to insert the rolled bag into the inlet 14. Due to the airflow through the apparatus (because the valve 21 is open), the bag is sucked up through the inlet pipe 23 and is then propelled through the discharge pipe 11, exits at the outlet 15, and drops into the concrete mixer.

The insertion step is repeated until all of the predetermined number of bags have been placed into the input end. Again, as mentioned above, this may be because the user counted out a particular number of bags. Alternatively it may be because the user keeps inserting bags until the display 19 shows that the desired number of bags have been inserted.

Yet another approach is to configure the counter as a count-down counter. In such an arrangement, the counter is set to some desired number of bags, and then counts down as each bag passes the counter. The user stops inserting bags when the display 19 has reached zero. Any of a number of convenient annunciations may be incorporated to provide an unmistakable signal to the user that the counter has reached zero, for example the counter could be linked operatively to the valve 21 so that the valve 21 shuts off when the counter reaches zero.

In any event, when the loading is done, the user will shut the valve 21 (if it has not already been shut off through a linkage with the counter as just described).

It will be appreciated that to minimize risk of jamming, it is desirable to wait, before inserting a bag, until any previous bag has exited the apparatus and has entered the concrete mixer. This is easy and unmistakable since the sound of the air flow through the apparatus is such that the user can easily know when a bag has exited the apparatus.

The bags can contain reinforcing fiber or coloring agent.

Stated differently, the apparatus can be described as a loading tube with an input end and an output end, the input end positioned between three and six feet above a surface, the output end positioned between six and twenty feet above the surface. The surface is sufficiently strong to support a concrete mixer. The loading tube further comprises at least one nozzle positioned at the loading tube between the input end and the output end, the nozzle disposed so that air passing through the nozzle into the loading tube flows toward the output end.

A valve is connected with the at least one nozzle, disposed to permit and deny air flow through the valve to the at least one nozzle. There can be two or three or four or more nozzles. The inlet 14 can be between five and ten inches in diameter. The entirety of the loading tube can have an inside diameter between two and ten inches.

Figure 2:
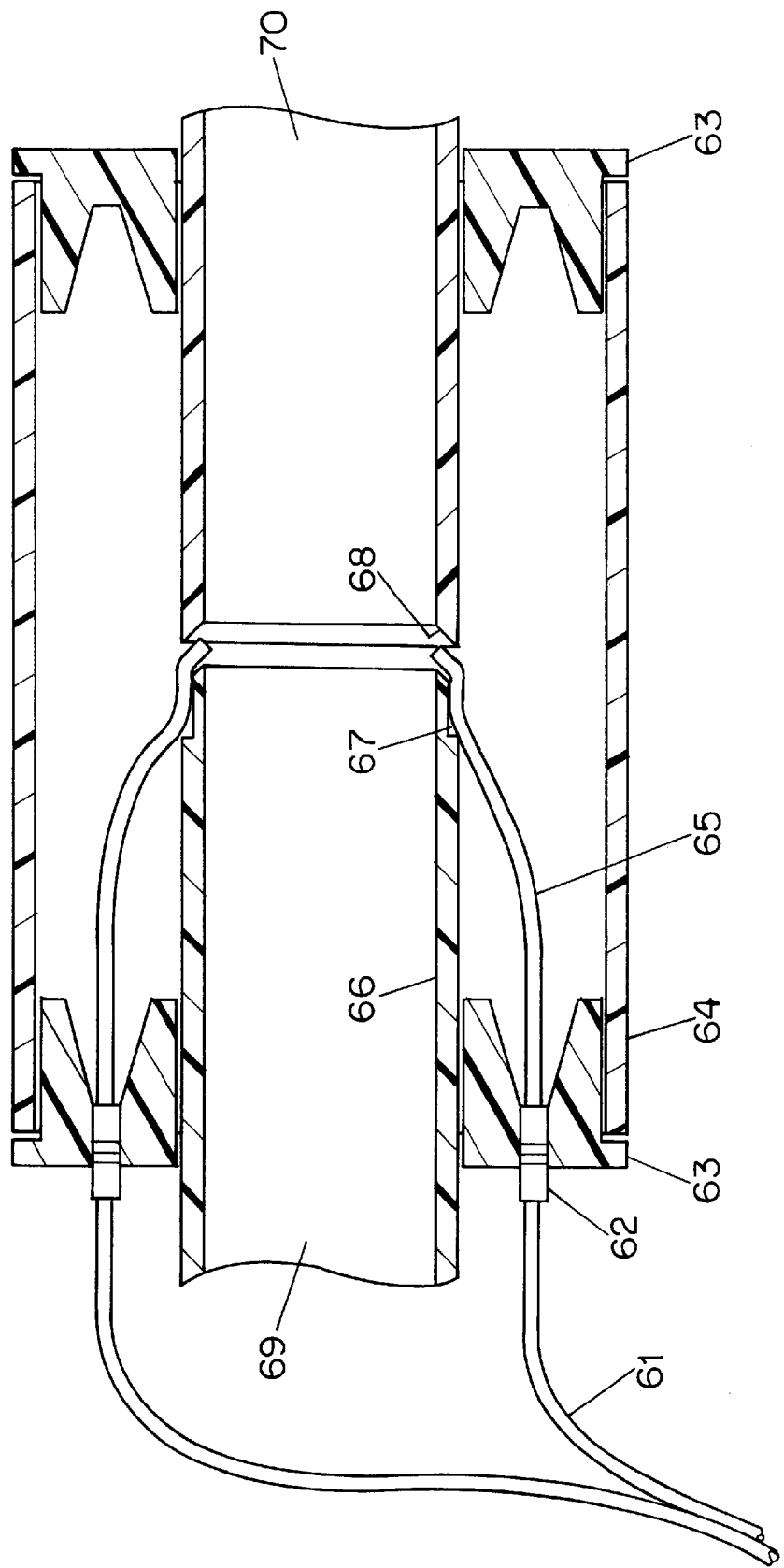
FIG. 2 is a cross-section view of a first embodiment of the invention.

FIG. 2 is a cross-section view of a nozzle assembly of a first embodiment of the invention. In this embodiment there is an inlet pipe 69 and an outlet pipe 70, each of which may be schedule 40 PVC pipe. Reducing bushings 63 provide an interface with outer tube 64 which can be ten-inch schedule 40 PVC. Tapped holes in bushings 63 receive threaded fittings 62 which connect with supply lines 61. Lines 61 go to a manifold and control valve, omitted for clarity in FIG. 2.

Nozzle lines 65, of which there may be eight or some other number. These nozzle lines have two ends, one end of which may be glued to openings at the tapped fittings 62, and the other end of which goes to slots 67. Bevel 68 helps to guide the nozzle air into the tube 70.

Figure 3:
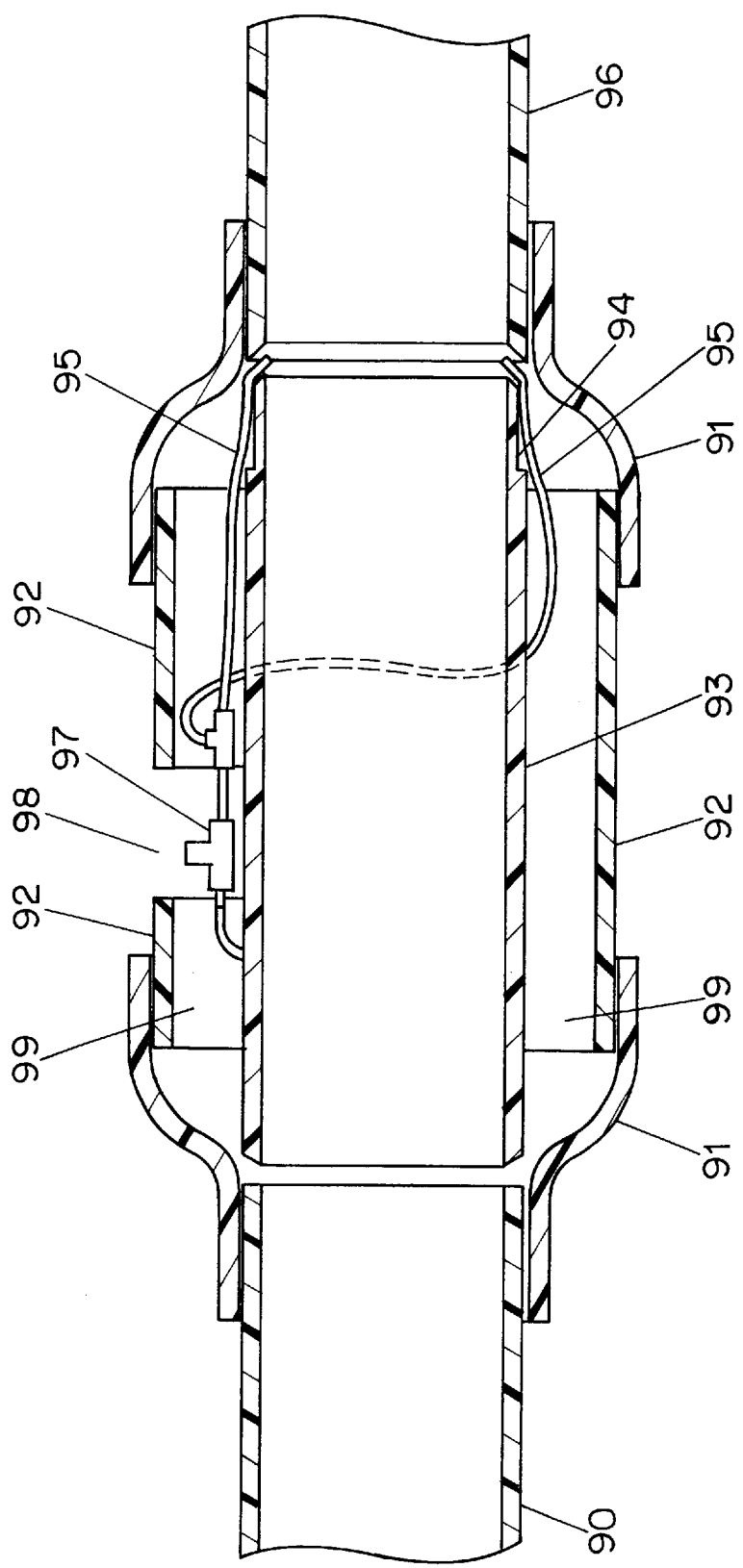
FIG. 3 is a cross-section view of a second embodiment of the invention.
Figure 6:
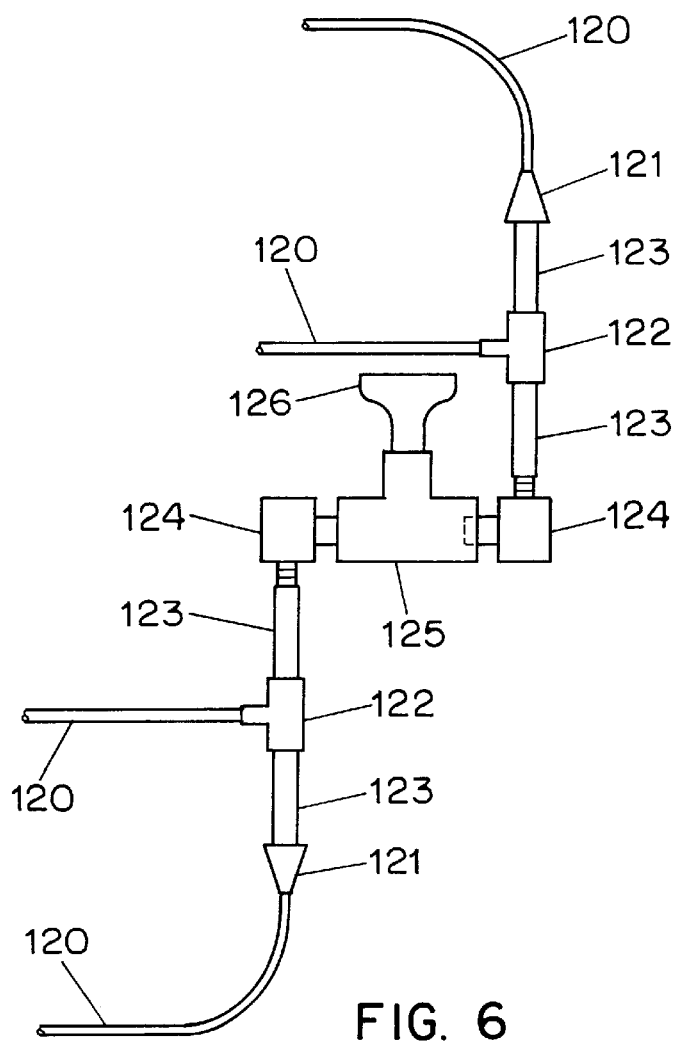
FIG. 6 is a plan view of a manifold assembly.

FIG. 3 is a cross-section view of a nozzle assembly of a second embodiment of the invention. In this embodiment, pipe 90 is nearest to the inlet 23, and pipe 96 is nearest to the outlet end 11. Pipes 90 and 96 may be 8-inch PVC schedule 40 pipe. Two reducing couplers 91 are employed, each reducing ten-inch pipe to eight-inch pipe. A section of ten-inch pipe 92 fits between the two couplers 91, which may be schedule 40 PVC. Pipe 92 has an opening 98 formed so that fittings 97 are accessible from outside of the nozzle assembly. An inner pipe 93 may be schedule 40 PVC, also eight inches in diameter. Grooves 94 are routed in the exterior of inner pipe 93, one to receive each of eight nozzle tubes 95. T fittings and compression fittings may be employed to bring the eight nozzle tubes to air inlets at fittings 97. Voids 99 may be filled with expandable foam which expands and hardens to fill the voids 99. The foam helps to reduce the noise level and helps to secure all the parts in place. It helps to secure tubes 95 and associated T fittings in place and helps to define the position of tube 93 relative to couplers 91 and relative to tube 92. This assembly may contain two manifold assemblies such as are shown in FIG. 6.

Figure 4:
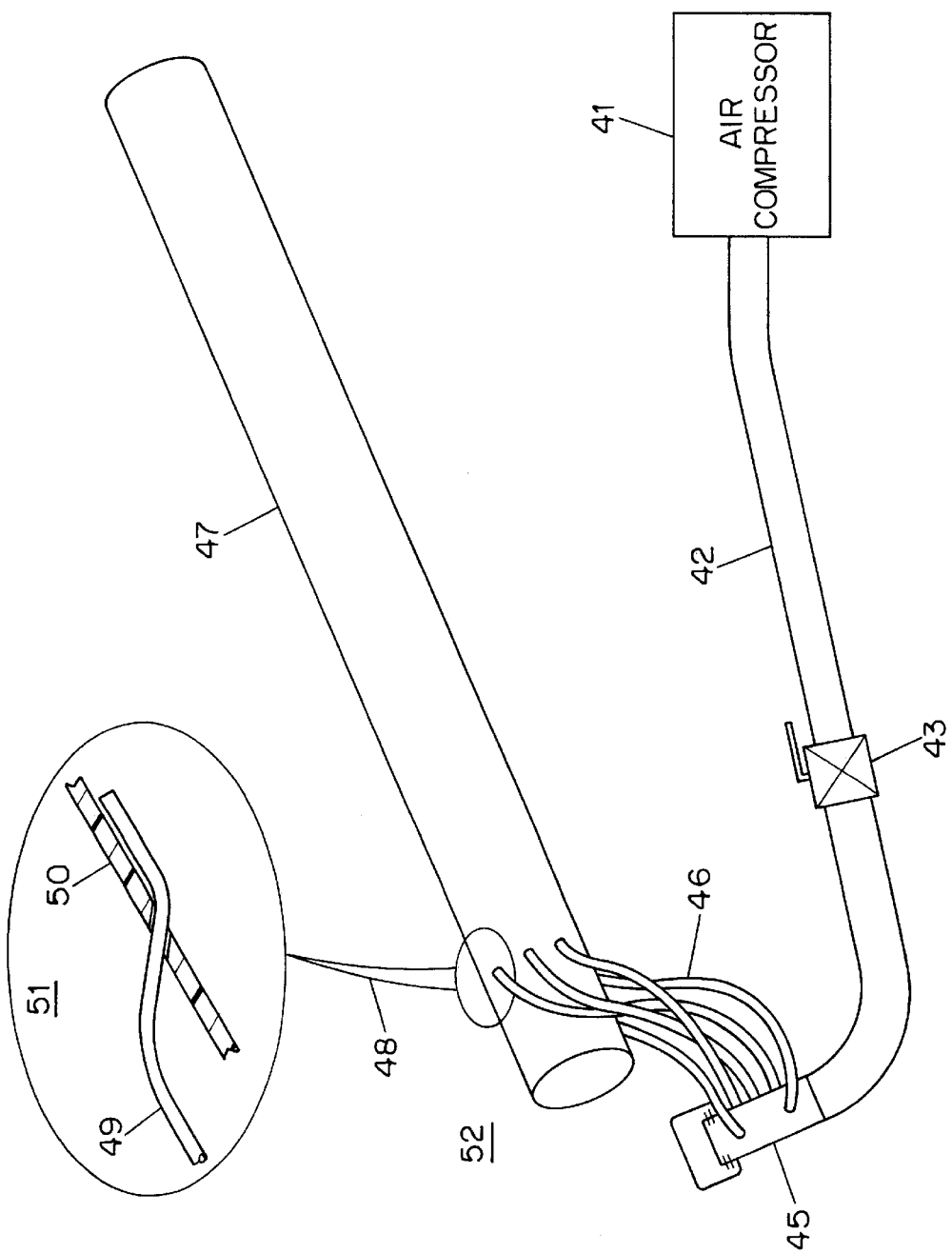
FIG. 4 is a cross-section view of a third embodiment of the invention.

FIG. 4 is a cross-section view of a nozzle assembly of a third embodiment of the invention. Main tube 47 can be ten feet of schedule 35 sewer pipe, eight inches in diameter. Five holes are drilled each at an angle as shown at 49 and 50 in FIG. 5, equally spaced around the circumference of the tube 47. Supply lines 46, each made from ⅜-inch air line, are installed. Detail region 51, denoted by arrow 48, shows one such supply line 49 entering the angled hole and passing through sidewall 50 of tube 47. Three inches of the line 49 may extend into the interior of tube 47.

Supply lines 46 are inserted into a one-piece manifold 45. Manifold 45 receives air through line 44 from valve 43, which in turn receives air through line 42 from air compressor 41.

Figure 5:
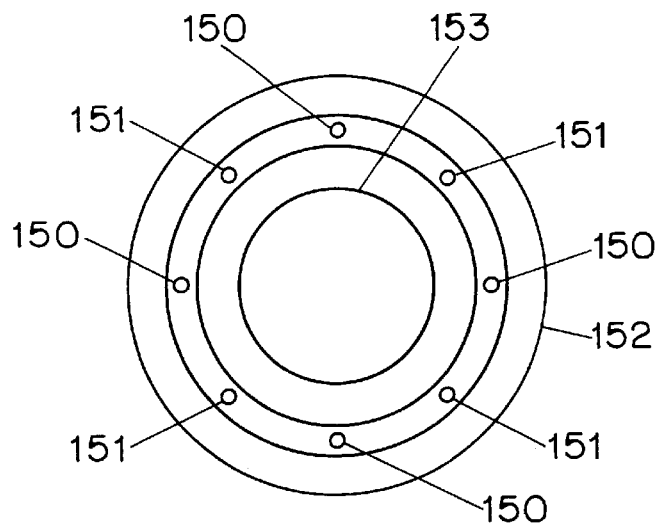
FIG. 5 is a cross-section view of a fourth embodiment of the invention.

FIG. 5 is an end view of a nozzle assembly according to FIG. 3. Edge 153, furthest away in FIG. 6, is at the end closest to the inlet 23. Edge 152 is the nearest end to the viewer in FIG. 6 and is the end closest to the outlet 11. In this view what is shown is the interior of the nozzle assembly. Nozzles 151, four in number, may be seen equidistant around the circumference. Nozzles 150, also four in number, are evenly spaced between the nozzles 151.

In this embodiment the four nozzles 150 form a first manifold assembly and the four nozzles 151 form a second manifold assembly. Each manifold assembly is connected to a control valve and each control valve draws from a supply of compressed air.

FIG. 6 shows one such manifold assembly in plan view. Four nozzles are made from ¼-inch air lines 120. Reducing couplings 121 reduce ⅜-inch air lines 123 to the ¼-inch lines. Reducing T fittings 122 are used as shown. Right-angle reducing fitting 124 goes from half-inch pipe thread to ⅜ inch compression fitting to lines 123. T fitting 125 provides a connection point 126 which is preferably a three-quarter pipe fitting.

Two such manifolds as shown in FIG. 6 may be used in construction of the assembly of FIG. 3, to provide eight nozzles. Eight such nozzles, as mentioned above, may be seen in FIG. 5 provision of two manifolds and manifold assemblies offers interesting benefits. Experience shows, for example, that for many material bags it suffices to operate only one of the manifolds and only four of the nozzles. For some material bags, on the other hand, it turns out to be necessary to operate both manifolds and all eight of the nozzles. When only one manifold is operated, this saves air as compared with operating two manifolds. It also makes less noise.

It should also be appreciated that in a single installation, it may be desirable to use two or more nozzle assemblies, at each of two or more locations along the flow path.

Those skilled in the art will have no difficulty devising myriad obvious variations and improvements upon the apparatus and method described herein, all of which are intended to be encompassed within the claims that follow.

What is claimed is:

1. A material loading method comprising the steps of:

positioning a loading tube with an input end and an output end, and a concrete mixer having a fill opening, so that the fill opening is below the output end;

causing air to flow through at least one nozzle positioned at the loading tube between the input end and the output end, the nozzle disposed so that the air flows toward the output end;

counting a predetermined number of water-soluble bags of material; comprising at least one of reinforcing fiber and coloring agent placing one of the predetermined number of bags into the input end; and repeating the placing step until all of the predetermined number of bags have been placed into the input end.

2. The method of claim 1 comprising the further step of causing the flow of air to cease after all of the predetermined number of bags have been placed into the input end.

3. The method of claim 1 where in the repeating step further comprises waiting until any previous bag has entered the concrete mixer.

4. The method of claim 1 wherein the material is reinforcing fiber.

5. The method of claim 1 wherein the material is coloring agent.

\* \* \* \* \*